Feb. 27, 1951    M. N. FAIRBANK    2,543,159
SHEET-ARRESTING MECHANISM FOR
PHOTOGRAPHIC APPARATUS
Filed March 16, 1948    3 Sheets-Sheet 1

INVENTOR
Murry N. Fairbank
BY Donald L. Brown
Attorney

Feb. 27, 1951 M. N. FAIRBANK 2,543,159
SHEET-ARRESTING MECHANISM FOR
PHOTOGRAPHIC APPARATUS
Filed March 16, 1948 3 Sheets-Sheet 3

INVENTOR
Murry N. Fairbank
BY
Donald L. Brown
Attorney

Patented Feb. 27, 1951

2,543,159

UNITED STATES PATENT OFFICE 2,543,159

SHEET-ARRESTING MECHANISM FOR PHOTOGRAPHIC APPARATUS

Murry N. Fairbank, Belmont, Mass., assignor to Polaroid Corporation, Cambridge, Mass., a corporation of Delaware Application March 16, 1948, Serial No. 15,138

14 Claims. (Cl. 95—13)

1

This invention relates to improvements in photographic apparatus wherein a photosensitive film material and another sheet material are advanced and compressed and more particularly to improved mechanism for stopping advancement of the materials at predetermined stages thereof.

An object of the invention is to provide a stop mechanism for a film and another separately supplied sheet material which is of simple and inexpensive construction and which is positive in operation.

Another object of the invention is to provide a stop mechanism which is so mounted with respect to other elements of the apparatus as to operate directly upon but one of two separate sheet materials and to cooperate with the other elements of the apparatus to stop movement of both materials.

A further object of the invention is to provide in a hand-held camera, in which the film and other sheet material are manually advanced, arresting mechanism which is operative in conjunction with surface alterations of one or more sheet materials such as depressions, perforations or elevations formed therein or thereupon, and which incorporates improved release means enabling advancement of the sheet materials to be resumed.

Still another object of the invention is to provide a stop mechanism of the character described wherein two individual detent elements thereof are adapted to enter spaced marginal perforations, or to engage other irregularities, in a moving sheet material, either separately or simultaneously, each of the elements being individually capable of arresting the sheet material irrespective of operation of the other.

Further objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 2 is a fragmentary plan view of a type of

Figure 3:
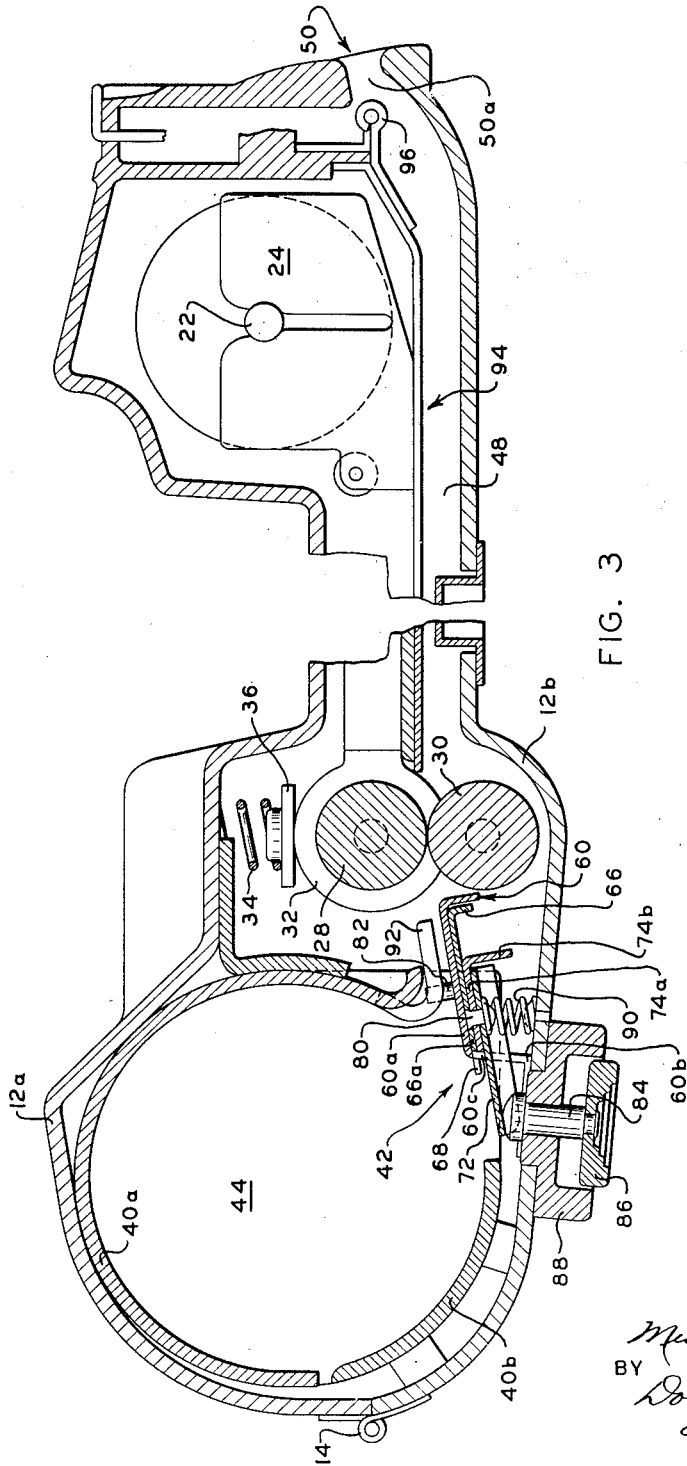
Figure 4:
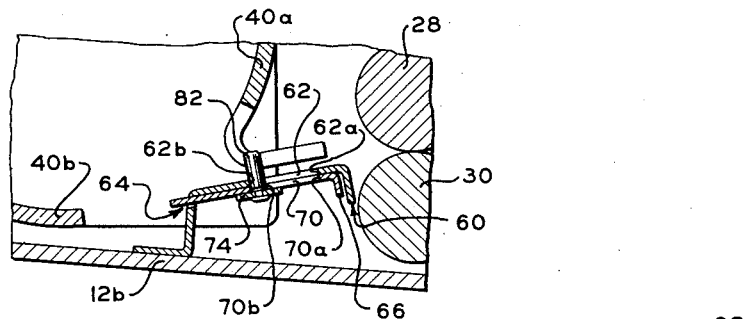
Figure 5:
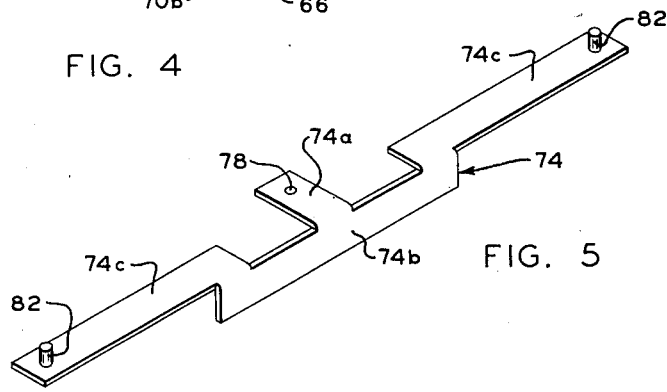

2 sheet material suitable for use in a camera embodying mechanism of the invention;

Fig. 3 is a sectional view of the sheet-arresting mechanism and portions of a camera associated therewith;

Fig. 4 is a sectional view of the sheet-arresting mechanism which illustrates parts thereof in greater detail;

Fig. 5 is a perspective view of detent means of the mechanism; and

Figure 6:
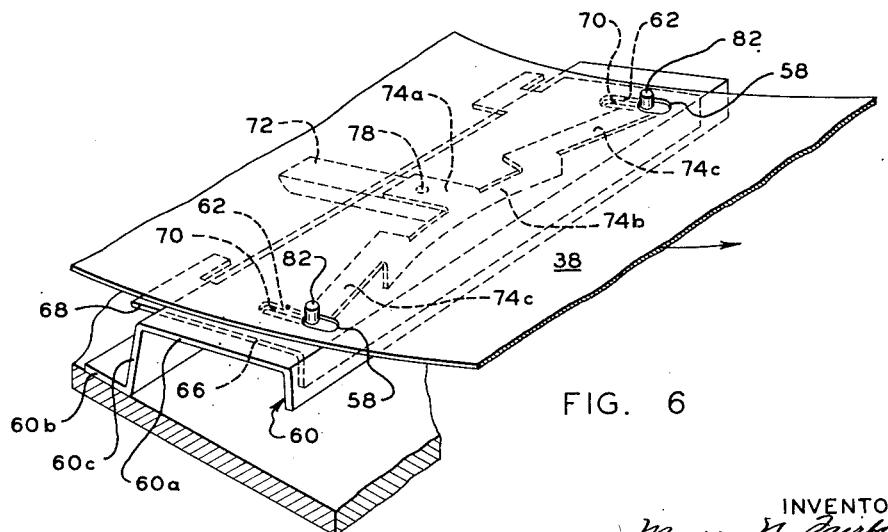

Fig. 6 is a perspective view of the sheet-arresting mechanism and illustrates its operation relative to a sheet material.

Mechanism of the invention is suitable for embodiment in photographic apparatus employing a continuous length of fim, such as a roll film, and especially in a camera wherein such a film is moved from a supply means to an exposure position, to a processing position and finally, to a position where access thereto may be had as, for example, to a position exteriorly of the casing. More particularly, the mechanism is adapted to use in a camera wherein two sheet materials, one of which is the film, are individually mounted and are manually advanced and guided from separate positions to a superimposed relationship between a compressing means. When the materials are subjected to the compressing means as, for example, by being drawn manually therebetween, a film-processing fluid, preferably releasably carried by one of the materials, is released and spread between said materials to provide a permeation and processing of the film.

In spreading the film-processing fluid between exposed areas of film material and like areas of the other sheet material by drawing the materials between a pair of compressing members as, for example, for forming a positive print on one of the materials, provision of an even layer of the fluid between the materials may be considered generally desirable. A steady, uninterrupted relative movement of the materials and compressing members is conducive to providing such an even layer of the fluid between the materials. Where said materials are manually drawn between the compressing means, inclusion in the camera of an arresting mechanism for automatically stopping the materials when spreading of the fluid is completed is of importance for enabling said steady movement during the spreading operation. If no stop mechanisms were employed so that positioning of the materials was necessarily obtained by some visual means, such as through provision of an index on the sheet materials and the positioning of said index against a fixed index of the camera, it will be understood that manual advancement of the materials during near approach of the movable index to the fixed index might be hesitant and uneven to avoid moving the materials too far. If movement of the materials were excessively uneven, a layer of undesirable characteristics might be produced, with resultant unsatisfactory processing of the film. Incorporation of an effective stop mechanism in the camera enable an even, steady movement of the materials to a predetermined stage of said movement, namely, at least to that stage at which spreading of the fluid has been completed. The mechanism thus contributes to a satisfactory spreading of the fluid which, in turn, leads to an efficient processing of the film. Where formation of a positive print is an accompaniment of the fluid-spreading and film-processing procedures, it follows that the stop mechanism facilitates production of such a print and contributes to improved quality thereof.

Figure 1:
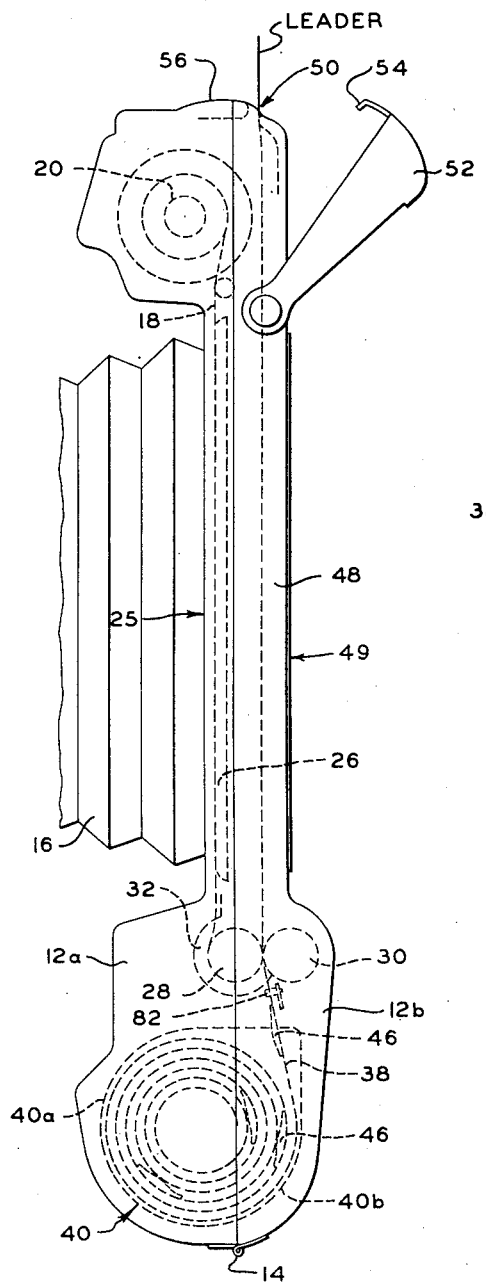
Figure 1 is a diagrammatic view of a camera wherein a roll of film and a roll of another sheet material are separately mounted, an element of the sheet-arresting mechanism being shown in contact with one of the materials.

Referring to Fig. 1, a camera incorporating mechanism of the invention is shown somewhat schematically and illustrates the general relation of components of the camera to sheet materials used therein. The camera comprises casing portions 12a and 12b, pivotally mounted with respect to one another by a hinge 14, it being understood that a latch (not shown) is employed at an end of the casing portions opposite to hinge 14 for holding them at closed position. Pivotal mounting of the casing portions permits ready access therewithin for threading the materials used in the camera. A fragment of a bellows 16 is shown attached to casing portion 12a and, while forming no part of the present invention, it is to be understood that various elements for exposing the film; such as lens and shutter means (not shown), are incorporated with the camera.

A roll of photosensitive film material 18 is releasably contained on a spool 20, a protuberance 22 (Fig. 3) at each end of the spool being rotatably mounted in an adapter 24. The film is positioned across an exposure aperture 26 (Fig. 1) where it is held for photographic exposure, as by a plate 26. The film is threaded around a pressure-applying member such as a roller 28 mounted, for example, within casing section 12a. When the film is thus threaded and when casing portions 12a and 12b have been closed said film is thereby positioned between said member 28 and another pressure-applying member such as roller 30, mounted in casing section 12b. Roller 28 is rotatably mounted at each extremity in a member 32, said members 32 preferably being in the form of pivotally movable arms, enabling roller 28 to be moved toward and away from roller 30.

As shown in Fig. 3, roller 28 is biased toward roller 30 by compression spring means 34 bearing against supporting member 36 which, in turn, bears upon arm members 32. It will be noted that arm members 32 comprise enlarged portions adjacent roller 28 which are adapted to support member 36 and to serve as guides for at least film 18 during travel of the latter around said roller 28, thereby serving to prevent sideways displacement of said film.

A preferably loose roll of a sheet material 38, such as a roll of a suitably treated paper, is releasably contained in a sectional, substantially cylindrical holder 40 and is provided for the purpose of being compressed with exposed surface areas of film 18. One section 40a of the holder is preferably mounted within casing portion 12a and the other section of the holder 40b within casing portion 12b, said sections thus being pivotally movable with respect to one another when said casing portions are opened and closed for loading sheet material in the holder. Sections 40a and 40b cooperate to provide an aperture 42 through which material 38 may be released from the holder for movement toward compressing rollers 28 and 30. Holder 40 comprises end plates 44 (Fig. 3) attached, for example, to section 40a which serve as guides for limiting sideways movement of sheet material 38 while it is being withdrawn from the holder.

Figure 2:
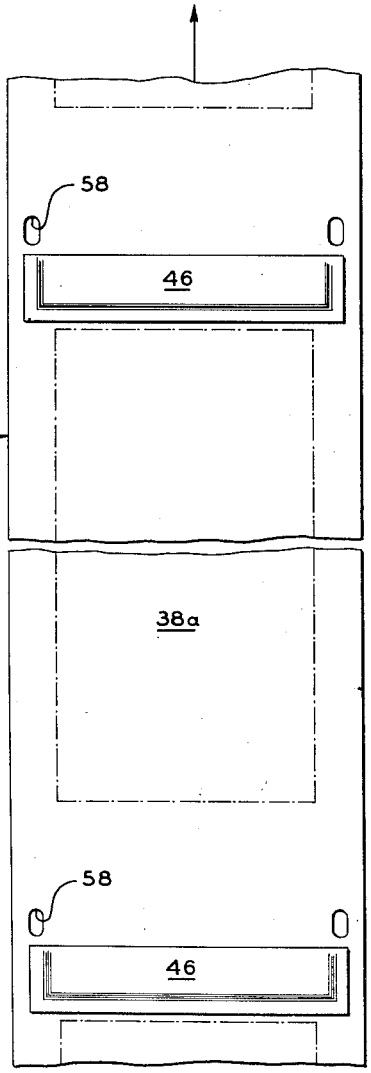

Sheet material 38 preferably carries a plurality of fluid containers 46 mounted in spaced relation to one another upon a surface which is to be brought face-to-face with film 18 between pressure rollers 28 and 30. Each of said containers 46 releasably holds a predetermined quantity of processing fluid for treating an exposed area of film 18 and, as shown in Fig. 2, is positioned, longitudinally, immediately to one side of an area 38a of the sheet material which is to be superimposed and compressed with said exposed area of film, the position of said container being adapted to release of the fluid to said areas. When sheet material 38 is placed in face-to-face relation with film 18 and successive areas of the materials are compressed while being drawn between pressure rollers 28 and 30, the film processing fluid is released and spread between said materials and they are releasably bonded together by said fluid.

In the form of camera illustrated herein, after being passed between the pressure rollers the compressed and bonded materials are drawn through a light-tight chamber 48, wherein the materials may be held for a brief processing period, and through a slot 50 provided between extremities of casing portions 12a and 12b when the latter are at closed position. A door 49 may preferably be provided in casing 12b to permit access to chamber 48 for removing an image-bearing portion of the materials prior to their egress through slot 50. Slot 50 comprises dimensions which are predetermined with respect to those of the treated film 18 and sheet material 38, edge areas 50a of said slot serving to guide the edges of the materials while the latter are drawn therethrough. Means for severing each treated portion of the materials from succeeding portions and for forming a plurality of leaders for drawing said succeeding portions through the apparatus comprise a pivotal yoke-like member 52 having a severing edge 54, said member 52 being adapted to bend portions of said materials which extend from slot 50 toward surface 56 and to hold an area of the materials in contact with said surface 56 while they are severed.

Mechanism for arresting movement of the film and other sheet material is preferably mounted in casing section 12b and is shown in detail in Figs. 3 and 4. Said mechanism is adapted to cooperate with sheet materials having a plurality of predeterminedly spaced perforations 58 formed along the longitudinal margins thereof, the formation of said perforations in a sheet material being illustrated in Fig. 2. The mechanism, as illustrated in Fig. 3, includes a rigid angled member 60 comprising a portion 60a adapted to slidable movement of sheet material 38 thereacross and having a dimension suitable for accommodating the entire width of said sheet material. Member 60 comprises another portion 60b which is angularly formed with respect to portion 60a for rigid attachment to camera casing 12b. A perforation 62 (Fig. 4) formed adjacent each extremity of portion 60a is so positioned that, when sheet material 38 is moved across said portion 60a, perforations 58 of the sheet material are caused to overlie perforations 62 at a given stage of movement of said sheet material. In another portion 60c of said member 60 a pair of slots 64 are formed for receiving mounting means for a movable member 66. Member 66 comprises a planar portion 66a, a pair of ears 68 extending from said portion 66a for insertion in said slots 64, and a pair of perforations 70, adapted to be positioned underlying perforations 62 of member 60. Member 66 is mounted for pivotal movement with respect to said rigid member 60, said ears 68 when mounted in slots 64 serving as hinge components for permitting said pivotal movement. A lever 72 rigidly attached to a mid-portion of movable member 66 and extending outwardly therefrom provides a means for rocking member 66.

An elongated member 74 (Fig. 5) is adapted to mount a pair of detent means in such manner as to enable individual movement of said detent means in a plurality of directions, said movement leading either to arrest or release of the sheet material. Mounting member 74 is suitably composed of a spring-like material as, for example, of a Phosphor bronze and comprises a central portion 74a having a perforation 78 formed therein through which means such as rivet 80 (Fig. 3) is inserted for rigidly attaching said portion 74a to a mid-portion of movable member 66. Referring again to member 74, as shown in Fig. 5, a second portion 74b depends angularly from portion 74a and a pair of portions 74c extend from portion 74b substantially in the plane of said first-named portion 74a. A pair of detent pins 82 are mounted adjacent the extremities of said portions 74c, said detents being formed for slidable movement within the aforesaid perforations formed in members 66, 60 and in sheet material 38, it being shown in Figs. 4 and 6 that said perforations dimensionally exceed the diameter of the pins. Because of the flexible properties of spring-like member 74 and the arrangement of its parts in two planes it will be seen that pins 82 are adapted to be moved separately or simultaneously in either of said planes. It will also be recalled that member 66, to which detent mounting member 74 is attached, is pivotally mounted upon fixed member 60, thus enabling detent pins 82 to be pivoted toward and away from sheet 38. Means for rocking pivotal member 66 to provide pivotal movement of pins 82 comprises plunger 84, engaging lever 72 and extending through casing 12b, and push-button 86, the latter having guard 88 associated therewith. Compression spring 90 applies bias to pivotal member 66 so that the latter is normally positioned contiguous fixed member 60 and, accordingly, detent pins 82, extending through perforations 70, are caused also to extend through perforations 62 and to project beyond the surface of portion 60a for coacting with perforations 58 in the sheet material. Pivotal movement of member 66, in a direction away from member 60, also moves detent pins 82 away from said perforations in the sheet material, pivotal movement in said direction being provided by depressing button 86, causing plunger 84 to actuate lever 72 against bias of spring 90.

Rigid member 60 provides a surface for supporting sheet material 38 during withdrawal of the detent pins from perforations 58 thereof. Means for supporting an opposite surface of the sheet material during insertion of the detent pins in perforations 58 comprises a pair of members 92 rigidly mounted so as to be positioned opposite to and narrowly spaced from portions of said rigid member 60 adjacent its extremities, through which perforated portions detent pins 82 project. Members 92 may preferably comprise a planar or slightly curved surface for contacting longitudinal margins of sheet material 38 and may be bifurcated or slotted for receiving and permitting movement of extremities of pins 82 therewithin. Supporting members 60 and 92 are preferably spaced apart only by an amount such as to enable unrestricted movement of said margins of sheet material 38 therebetween during travel of said material from holder 40 to pressure rollers 28 and 30.

The aforesaid constructions for mounting, guiding and compressing film 18 and sheet material 38 comprise coacting elements which provide a cooperation of the film and other sheet material in the processing of the film. Said elements also coact with the aforesaid arresting mechanism during advancement of the materials to insure proper sideways positioning of perforations 58 with respect to detent pins 82 and to enable contact of said detent pins with but one of the materials for arresting movement of both materials. Said constructions permit employment of marginal perforations in but one of the materials and thus avoid any necessity for positioning perforations of one material in register with those of another material for subjecting said materials to an arresting mechanism. While adapted to simultaneous operation of the pair of detent pins 82, mounting means 74 for said detent pins, which allows them to be individually pivoted, permits either of the pins to enter a perforation in a given margin of sheet material 38 if the perforation in the other margin should be out of alignment or imperfectly formed, so as to prevent entrance of the other detent pin thereinto.

Means coacting for proper registration of one material with the other comprise elements 20, 22, and 24 for mounting film 18 and means 40 for mounting sheet material 38, namely, elements which are positioned parallel to one another and perpendicular or parallel, as the case may be, to the direction of movement of the materials. Elements further contributing to superimposition of one material with the other comprise arm members 32 and sides 50a forming slot 50, taken in conjunction with end plate 44 of holder 40, said elements providing a plurality of guiding surfaces which are parallel to one another. Pressure rollers 28 and 30 provide an engagement of the superimposed sheet materials such that an operation performed upon one of the sheet materials may, in effect, be transmitted to the other of said materials. The operation performed by the arresting mechanism is thus transmitted from sheet material 38 to film 18.

Operation of the apparatus with respect to a film material and another separately supplied sheet material is illustrated in Figs. 1 and 6 wherein said materials are drawn manually through the camera. In Fig. 1 it may be assumed that casing sections 12a and 12b have previously been pivoted to open position and that an inner assembly 94 (Fig. 3) of the camera upon which are preferably mounted pressure plate 26 (Fig. 1), roller 28 and adapter 24 (Fig. 3), has also been pivoted open on hinge 96 (Fig. 3) for threading the sheet materials; that a spool of film 18 and a roll of sheet material 38 have been loaded in their respective mounting means 24 and 40; that a leader of the film has been drawn across an exposure plane rearwardly of bellows 16; that inner assembly 94 has then been closed and the leader of film positioned around roller 28, through opened chamber 48 and across the opened half of slot 50; that a leader of sheet material 38 has been threaded in superimposed relation with said leader of film 18 in opened chamber 48 and opened slot 50; and that the ends of both leaders are held in contact with one another exteriorly of slot 50 so that the edges of the materials are parallel to one another. Casing portion 12b has then been pivoted to closed position, placing a narrow transverse area of the leaders of both materials in a superimposed compressed condition between rollers 28 and 30, the materials thus being suitably disposed for advancement of succeeding areas of the film to exposure position and of said areas of the film and like areas of the other material to superimposition for processing of the film.

With film 18 and sheet material 38 threaded as above described, and upon advance of a photosensitive area of the film to exposure position, detent pins 82, which have borne against the surface of the leader of sheet material 38, are caused to enter perforations 58. The detent pins are carried forward by the materials, in the direction of advancement of the latter, to the limits 62a and 70a (Fig. 4) of perforations 62 and 70, respectively, and are halted by said limits to provide arrest of the sheet material. The construction of detent mounting member 74, and more particularly the flexible spring-like properties of portions 74b and 74c thereof, enable the aforesaid movement of detent pins 82 relative to perforations 62 and 70, provide a bias of the pins in a direction opposite to that in which they are carried, and provide a bias of said pins such that they bear against the surface of sheet material 38 and enter the perforations in said material. Movement of detent pins 82 in the above-described directions is illustrated in Fig. 6 wherein carriage of the pins to the maximum distance permitted by perforation edges 62a and 70a and flexing of portion 74b of member 74 to bias said detent pins in a direction opposite to that in which they are carried by sheet 38 is shown. Concurrent with the aforesaid operations, it may be assumed that a light-sensitive area of film 18 has been positioned across the exposure plane for a photographic exposure. Assuming proper initial registration of the respective leaders of the film and other sheet material, when a pair of perforations 58 are brought adjacent detent pins 82, a fluid container 46 will automatically be positioned as shown in Fig. 1 in readiness for placement immediately in advance of the initially exposed area of film.

After exposure of the film, advancement of the exposed area to process the same, while positioning a succeeding area of unexposed film in the exposure plane, is permitted by momentarily depressing push-button 86, causing plunger 84 to actuate lever 72 and to rock pivotal member 66, rotation of the latter causing pins 82 to be withdrawn from perforations 58 in the sheet material. Immediately upon removal of pins 82 from perforations 58, bias of the flexed portion 74b of pin mounting member 74 causes the detent pins to leave perforation edges 62a and 70a and to return to a position in contact with perforation edges 62b and 70b, the last-named position automatically placing the tips of the detent pins once again in contact with nonperforated marginal portions of sheet 38 when push-button 86 is released. Upon advancing the materials to a stage whereat the aforesaid exposed area has been subjected to compression and placed in chamber 48, detent pins 82 again enter perforations 58 and movement of the materials is arrested. The aforesaid procedure may be repeated for each exposed frame of film, the arresting mechanism automatically stopping the sheet materials when an unexposed area of the film is positioned in the exposure plane and an exposed and processed area is positioned in chamber 48. A momentary depression of button 86 releases the arresting mechanism, it being unnecessary to hold said button depressed to resume advancement of the materials.

Door 49 may be utilized for removing portions of the materials from chamber 48 after the film has been processed as, for example, for removing a perforated section of sheet material 38 which contains a positive print. Each frame of processed film 18 and marginal portions of sheet 38 remaining bonded thereto may be severed externally of the casing by severance means 52, 54.

While constructions of the aforesaid apparatus described herein and particularly those relating to the sheet-arresting mechanism are believed to possess novel advantages, certain modifications thereof may be considered possible within the scope of the invention. One such modifiaction contemplates the slidable mounting and spring-biasing of each detent pin in an individual bearing, said bearing, in turn, being movably mounted and predeterminedly biased at each extremity of a movable member. Another modification for mounting the detent pins comprehends a plurality of interconnected rigid members, each member being spring-biased relative to the other to provide the operations described herein. Another embodiment contemplates employment of the sheet-arresting mechanism in an apparatus which also includes means for manually advancing one or more sheet materials.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a photographic apparatus, a stop mechanism for use with a sheet material having a plurality of marginal perforations comprising a rigid plate-like member extending transversely of said sheet material for supporting said material, means forming a pair of slots adjacent the extremities of said rigid plate-like member, a pivotal plate-like member substantially coextensive with and hingedly mounted upon the under side of said rigid plate-like member, means forming a pair of slots in said pivotal plate-like member which are capable of being positioned in register with the slots in said rigid member when said pivotal member is pivoted to contact with said rigid member, spring means biasing said pivotal member for establishing and normally maintaining said contact thereof with said rigid member, means for moving said pivotal member away from contact with said rigid member, a unitary spring-like member for mounting a pair of detents comprising a substantially flat central portion which is attached to a central part of the under surface of said pivotal plate-like member, a substantially flat intermediate portion depending angularly from said first-named portion, and a pair of substantially flat portions extending from said intermediate portion substantially in the plane of said first-named portion, and means comprising a pair of detents extending angularly from the extremities of said spring-like member, the aforesaid pivotal plate member and detent-mounting member enabling a plurality of movements of said detents relative to said perforations in said sheet material.

2. In a photographic apparatus in which a sheet material is advanced, means in said apparatus for arresting the movement of said sheet material, said arresting means comprising a member capable of engaging and holding said sheet material, and means for mounting said member in said apparatus so that it may engage said sheet material, said member comprising a unitary resilient element and at least one sheet-engaging detent mounted thereon, said unitary resilient element comprising a central portion secured to said mounting means, a resilient plate spring portion extending from said central portion, and a second resilient plate spring portion secured to the extremity of said first resilient portion, said second resilient portion mounting said one detent and having its principal plane at an angle of substantially 90 degrees to the principal plane of said first resilient portion, said resilient portions permitting movement of said detent relative to said central portion in at least two directions, one of said directions being substantially parallel to the travel of said sheet material and the other said direction being substantially perpendicular to the plane of said sheet material.

3. In a photographic apparatus in which a sheet material is advanced, means in said apparatus for arresting the movement of said sheet material, said arresting means comprising a member capable of engaging and holding said sheet material, and means for mounting said member in said apparatus so as to normally bias said member in the direction of said sheet material, said member comprising a unitary resilient element and a pair of sheet-engaging detents mounted thereon, said unitary resilient element comprising a central portion secured to said mounting means, a pair of resilient portions extending in opposite directions from said central portion, and a second pair of resilient portions, each said resilient portion of said second pair being integrally secured to the extremity of one of said first pair of resilient portions, each of said second pair of resilient portions mounting one of said detents, said resilient portions permitting movement of said detents relative to each other and to said central portion in at least two directions, one said direction being substantially parallel to the travel of said sheet material and the other said direction being substantially perpendicular to the plane of said sheet material.

4. In a photographic apparatus in which a sheet material is advanced, means in said apparatus for arresting the movement of said sheet material, said arresting means comprising a member capable of engaging and holding said sheet material, and means for mounting said member in said apparatus so as to normally bias said member in the direction of said sheet material, said member comprising a unitary resilient element and a pair of sheet-engaging detents mounted thereon, said unitary resilient element comprising a central portion secured to said mounting means, a pair of substantially flat resilient portions extending in opposite directions from said central portion and lying in a predetermined plane, and a second pair of substantially flat resilient portions, each said resilient portion of said second pair being integrally secured to the extremity of one of said first pair of resilient portions and lying in a plane at a predetermined angle to the plane of said first pair of resilient portions, each of said second pair of resilient portions mounting one of said detents, said resilient portions permitting movement of said detents relative to each other and to said central portion in at least two directions, one said direction being substantially parallel to the travel of said sheet material and the other said direction being substantially perpendicular to the plane of said sheet material.

5. In a photographic apparatus in which a sheet material is advanced, means in said apparatus for arresting the movement of said sheet material, said arresting means comprising a member capable of engaging and holding said sheet material, and means for mounting said member in said apparatus so as to normally bias said member in the direction of said sheet material, said member comprising a unitary resilient element and a pair of sheet-engaging detents mounted thereon, said unitary resilient element comprising a central portion secured to said mounting means, and a pair of resilient portions extending in opposite directions from said central portion, each of said resilient portions mounting one of said detents, said resilient portions permitting movement of said detents relative to each other and to said central portion in at least two directions, one said direction being substantially parallel to the travel of said sheet material and the other said direction being substantially perpendicular to the plane of said sheet material.

6. In a photographic apparatus for exposing a photosensitive sheet material having a plurality of exposible areas and for processing said photosensitive material in conjunction with another sheet material of the class wherein there is provided means for mounting a roll of said photosensitive sheet material, means for separately mounting a roll of said other sheet material, and means for guiding said materials to superimposition with one another, said last-named means comprising a pair of pressure-applying rollers for compressing said materials, the compression applied by said rollers during advancement of said sheet materials causing a liquid, contained between the outer surfaces of the superposed materials, to be distributed so as to process the photosensitive sheet material, the combination with said pressure-applying rollers of arresting means interposed in the path of one of said sheet materials in its travel to said pressure-applying rollers for operatively engaging said one sheet material to arrest movement thereof, said arresting means operating through the sheet material engaged thereby and through said pressure-applying rollers to apply a holding force to said other sheet material whereby operative engagement of said arresting means and the one sheet material is effective to hold both said sheet materials against movement, said arresting means comprising a pair of detents located to engage a pair of perforations in opposite edge portions of said one sheet material, each said detent being yieldably mounted for limited movement relative to the other in the direction of movement of said one sheet material, whereupon both detents may simultaneously engage a pair of perforations in said opposite edge portions even when said perforations are out of transverse alignment by a distance less than the maximum distance that one said detent can move relative to the other said detent in a direction paralleling the movement of said one sheet material, either detent alone being capable of applying a sufficient holding force to arrest said one sheet material.

7. In a photographic apparatus for exposing a photosensitive sheet material having a plurality of exposable areas and for processing said photosensitive material in conjunction with another sheet material of the class wherein there is provided means for mounting a roll of said photosensitive sheet material, means for separately mounting a roll of said other sheet material, and means for guiding said materials to superimposition with one another, said last-named means comprising a pair of pressure-applying rollers for compressing said materials, the compression applied by said rollers during advancement of said sheet materials causing a liquid, contained between the outer surfaces of the superposed materials, to be distributed so as to process the photosensitive sheet material, the combination with said pressure-applying rollers of arresting means interposed in the path of one of said sheet materials in its travel to said pressure-applying rollers for operatively engaging said one sheet material to arrest movement thereof, said arresting means operating through the sheet material engaged thereby and through said pressure-applying rollers to apply a holding force to said other sheet material whereby operative engagement of said arresting means and the one sheet material is effective to hold both said sheet materials against movement, said arresting means comprising a pair of detents located to engage a pair of perforations in opposite edge portions of said one sheet material, each said detent being yieldably mounted for limited movement relative to the other in the direction of movement of said one sheet material, whereupon both detents may simultaneously engage a pair of perforations in said opposite edge portions even when said perforations are out of transverse alignment by a distance less than the maximum distance that one said detent can move relative to the other said detent in a direction paralleling the movement of said one sheet material, either detent alone being capable of applying a sufficient holding force to arrest said one sheet material, and means accessible from the exterior of said apparatus for rendering said arresting means inoperative to hold said sheet materials.

8. In a photographic apparatus wherein a sheet material is moved along a predetermined path, mechanism for arresting the movement of said sheet material, said mechanism comprising, in combination, a member located adjacent the path of travel of said sheet material, a detent support, means for mounting said detent support for movement relative to said member and with said member interposed between the plane of travel of said sheet material and said support, resilient means for biasing said detent support in the direction of said member, a pair of detents, means for yieldably mounting said detents on said detent support so as to enable said detents to move in a plurality of directions relative to said support, one of said directions being parallel to the direction of movement of said sheet material past said detents whereby the latter, upon engagement with said sheet material, can be advanced, against the bias of said yieldable mounting means, a limited distance along with said sheet material and another of said directions being perpendicular to the plane of travel of said sheet material whereby said detents can be kept depressed merely by contact with said sheet material to permit substantially unhindered movement of the latter until the detent-engaging configurations of said sheet material reach, and are engaged by, said detents, said yieldable mounting means for said detents so mounting said detents upon said support that movement of said support away from said member against the bias of said resilient means positively moves said detents out of sheet-enagaging position, said resilient means so biasing said detent support and said detent mounting means so mounting said detents on said support that said detents are normally located in position to engage configurations on said sheet material for arresting movement thereof, and means for actuating said detent support to move said support against the bias of said resilient means and render said detents inoperative to engage and hold said sheet material.

9. In a photographic apparatus wherein a sheet material is moved along a predetermined path, mechanism for arresting the movement of said sheet material, said mechanism comprising, in combination, a member located adjacent the path of travel of said sheet material, a detent support, means for mounting said detent support for movement relative to said member and with said member interposed between the plane of travel of said sheet material and said support, resilient means for biasing said detent support in the direction of said member, a pair of detents, means for yieldably mounting said detents on said detent support so as to enable said detents to move in a plurality of directions relative to said support, one of said directions being parallel to the direction of movement of said sheet material past said detents whereby the latter, upon engagement with said sheet material, can be advanced, against the bias of said yieldable mounting means, a limited distance along with said sheet material and another of said directions being perpendicular to the plane of travel of said sheet material whereby said detents can be kept depressed merely by contact with said sheet material to permit substantially unhindered movement of the latter until the detent-engaging configurations of said sheet material reach, and are engaged by, said detents, said yieldable mounting means for said detents so mounting said detents upon said support that movement of said support away from said member against the bias of said resilient means positively moves said detents out of sheet-engaging position, said resilient means so biasing said detent support and said detent mounting means so mounting said detents on said support that said detents are normally located in position to engage configurations on said sheet material for arresting the movement thereof, and means accessible from the exterior of said apparatus for actuating said detent support to move said support against the bias of said resilient means and render said detents inoperative to engage and hold said sheet material.

10. In a photographic apparatus wherein a sheet material is moved along a predetermined path, mechanism for arresting the movement of said sheet material, said mechanism comprising, in combination, a member located adjacent the path of travel of said sheet material, a detent support, means for mounting said detent support for movement relative to said member and with said member interposed between the plane of travel of said sheet material and said support, resilient means for biasing said detent support in the direction of said member, at least one detent, means for yieldably mounting said detent on said detent support so as to enable said detent to move in a plurality of directions relative to said support, one of said directions being parallel to the direction of movement of said sheet material past said detent whereby the latter, upon engagement with said sheet material, can be advanced, against the bias of said yieldable mounting means, a limited distance along with said sheet material and another of said directions being perpendicular to the plane of travel of said sheet material whereby said detent can be kept depressed merely by contact with said sheet material to permit substantially unhindered movement of the latter until one of the detent-engaging configurations of said sheet material reaches, and is engaged by, said detent, said yieldable mounting means for said detent so mounting said detent upon said support that movement of said support away from said member against the bias of said resilient means positively moves said detent out of sheet-engaging position, said resilient means so biasing said detent support and said detent mounting means so mounting said detent on said support that said detent is normally located in position to engage configurations on said sheet material for arresting the movement thereof, said member having a recess therein through which said detent extends when in operative position, the walls of said recess limiting the movement of said detent relative to said support in a direction parallel to the path of movement of said sheet material, and means accessible from the exterior of said apparatus for actuating said detent support to move said support against the bias of said resilient means and render said detent inoperative to engage and hold said sheet material.

11. In a photographic apparatus wherein a sheet material is moved along a predetermined path, mechanism for arresting the movement of said sheet material, said mechanism comprising, in combination, a member located adjacent the path of travel of said sheet material, a detent support, means for mounting said detent support for movement relative to said member and with said member interposed between the plane of travel of said sheet material and said support, resilient means for biasing said detent support in the direction of said member, at least one detent, means for yieldably mounting said detent on said detent support so as to enable said detent to move in a plurality of directions relative to said support, one of said directions being parallel to the direction of movement of said sheet material past said detent whereby the latter, upon engagement with said sheet material, can be advanced, against the bias of said yieldable mounting means, a limited distance along with said sheet material and another of said directions being perpendicular to the plane of travel of said sheet material whereby said detent can be kept depressed merely by contact with said sheet material to permit substantially unhindered movement of the latter until one of the detent-engaging configurations of said sheet material reaches, and is engaged by, said detent, said yieldable mounting means for said detent so mounting said detent upon said support that movement of said support away from said member against the bias of said resilient means positively moves said detent out of sheet-engaging position, said resilient means so biasing said detent support and said detent mounting means so mounting said detent on said support that said detent is normally located in position to engage configurations on said sheet material for arresting the movement thereof, each of said member and said support having a recess therein, said recesses being adapted to register at least in part and said detent extending through said recesses when in operative position, the walls of at least one said recess limiting the movement of said detent relative to said support in a direction parallel to the path of movement of said sheet material, and means accessible from the exterior of said apparatus for actuating said detent support to move said support against the bias of said resilient means and render said detent inoperative to engage and hold said sheet material.

12. In a photographic apparatus wherein a sheet material is moved along a predetermined path, mechanism for arresting movement of said sheet material, said mechanism comprising, in combination, a member having a plate-like portion located adjacent the path of travel of said sheet material, a detent support, said plate-like portion and said support overlapping one another at least in part and said support being pivotally mounted on said member and with said plate-like portion interposed between the plane of travel of said sheet material and said support, resilient means for biasing said support in the direction of said plate-like portion, at least one detent, a resilient element for mounting said detent so as to enable said detent to move in a plurality of directions relative to said support, one of said directions being parallel to the direction of movement of said sheet material past said detent whereby the latter, upon engagement with said sheet material, can be advanced against the bias of said resilient element a limited distance along with said sheet material and another of said directions being perpendicular to the plane of travel of said sheet material whereby said detent can be kept depressed merely by contact with said sheet material to permit substantially unhindered movement of said sheet material until one of the detent-engaging configurations of said sheet material reaches and is engaged by said detent, said resilient element being secured on the side of said support remote from said member so that movement of said support away from said member against the bias of said resilient means positively moves said detent out of sheet-engaging position, said support and said member having recesses therein, said detent extending through said recesses when operatively engaging the sheet material, said resilient means and said resilient element so biasing said detent as to normally locate the same in position to engage configurations on said sheet material for arresting the movement thereof, and means accessible from the exterior of said apparatus for pivoting said support against the bias of said resilient means to render said detent inoperative to hold said sheet material.

13. In a photographic apparatus wherein a sheet material is moved along a predetermined path, mechanism for arresting movement of said sheet material, said mechanism comprising, in combination, a member having a plate-like portion located adjacent the path of travel of said sheet material, a detent support, said support being movably mounted on said member and with said plate-like portion interposed between the plane of travel of said sheet material and said support, a resilient means for biasing said support in the direction of said plate-like portion, a pair of detents, a resilient element for mounting said detents so as to enable each detent to move in a plurality of directions relative to the other and relative to said support, one of said directions being parallel to the direction of movement of said sheet material past said detents and another of said directions being perpendicular to the plane of travel of said sheet material, said resilient element having said detents secured thereto adjacent opposite ends thereof and being attached at an intermediate point to said support, said resilient element so mounting said detents upon said support that movement of said support away from said plate-like portion against the bias of said resilient means positively moves said detents out of sheet-engaging position, said resilient means and said resilient element so biasing said detents and said support as to normally locate said detents in position to engage configurations on said sheet materials for arresting the movement thereof, and means accessible from the exterior of said apparatus for moving said support against the bias of said resilient means to render said detents inoperative to hold said sheet material.

14. In a photographic apparatus wherein a sheet material is moved along a predetermined path, mechanism for arresting movement of said sheet material, said mechanism comprising a rigid member including a plate-like portion which extends transversely of the path of travel of said sheet material, said plate-like portion having a pair of slots formed therein, a detent support hingedly mounted on said rigid member and including a plate-like portion, said last-named plate-like portion having a pair of slots formed therein, spring means normally biasing said detent support so as to urge the plate-like portion of said support into engagement with the plate-like portion of said member, the slots in said plate-like portions registering at least in part when said plate-like portions are adjacent one another, means including a rocking lever secured to said detent support for pivoting said support, a pair of detents, a spring-like element mounting said detents on said detent support, said springlike element comprising a plurality of flat resilient portions integrally secured together and adapted to permit each detent limited movement with respect to the other and with respect to said support, said detents in operative sheet-engaging position extending through the slots in said plate-like portions, and means for engaging said rocking lever to pivot said support against the bias of said spring means and render said detents inoperative to arrest the sheet material, the plate-like portion of the detent support being located between the plate-like portion of said rigid member and the springlike element for mounting said detents with said plate-like support of said rigid member being nearest the path of movement of said sheet material.

MURRY N. FAIRBANK.

REFERENCES CITED

The following references are of record in the file of this patent:

UNITED STATES PATENTS

| Number | Name | Date |
|---|---|---|
| 1,274,223 | Weis | July 30, 1918 |
| 1,514,789 | Quinn | Nov. 11, 1924 |
| 1,501,677 | McMahon | July 15, 1924 |